United States Patent [19]
Bliss

[11] Patent Number: 5,563,746
[45] Date of Patent: Oct. 8, 1996

[54] REAL TIME MEDIA DEFECT SCANNING IN A SAMPLED AMPLITUDE READ CHANNEL

[75] Inventor: William G. Bliss, Thornton, Colo.

[73] Assignee: Cirrus Logic, Inc., Fremont, Calif.

[21] Appl. No.: 341,234

[22] Filed: Nov. 17, 1994

[51] Int. Cl.$^6$ ............................... G11B 5/09; G11B 5/035
[52] U.S. Cl. ................................................. 360/53; 360/65
[58] Field of Search ............................... 360/25, 31, 53, 360/46, 32, 65; 324/210, 212

[56] References Cited

U.S. PATENT DOCUMENTS

| | | |
|---|---|---|
| 5,392,295 | 2/1995 | Coker et al. . |
| 5,410,439 | 4/1995 | Egbert et al. ............................. 360/75 |
| 5,424,881 | 6/1995 | Behrens et al. ............................ 360/40 |

OTHER PUBLICATIONS

J. D. Coker, R. L. Galbraith, G. J. Kerwin, "Magnetic Characterization Using Elements of a PRML Channel", IEEE Transactions on Magnetics, vol. 27, No. 6, pp. 4544–4548, Nov. 1991.

W. Don Huber, "Single–Pass Flaw Detector for Magnetic Media", IEEE Transactions on Magnetics, vol. 30, No. 6, pp. 4149–4151, Nov. 1994.

*Primary Examiner*—W. Chris Kim
*Attorney, Agent, or Firm*—Howard S. Sheerin

[57] ABSTRACT

A real time defect scanning system integrated into a sampled amplitude read channel for detecting defects in a magnetic storage medium using a discrete time filter having an impulse response substantially matched to an error signature in a read back signal caused by a defect in the medium. The scanning system operates by writing a predetermined bit sequence to the storage device and detecting medium defects upon read back. In a sinusoidal read signal mode, a discrete time notch filter removes the fundamental frequency so that any remaining sidebands indicate a media defect. The discrete time defect filter enhances the signal so that a defect can be detected with a discrete time energy detector. The impulse responses of the notch filter and defect detection filter are programmable in order to adapt the defect scanning system to a particular disk drive, data density, or magnetic media.

21 Claims, 7 Drawing Sheets

$h_k = \{1\ 0\ 0\ 0\ -\underset{N}{1}\ 0\ 0\ 0\ -\underset{N}{1}\ 0\ 0\ 0\ -\underset{N}{1}\ \ldots\ldots\ \underset{N}{1}\}$

REAL TIME MEDIA DEFECT SCANNING IN A SAMPLED AMPLITUDE READ CHANNEL

FIELD OF INVENTION

The present invention relates to the control of magnetic storage systems for digital computers, and particularly, to a sampled amplitude read channel that employs discrete time signal processing to detect defects in a magnetic storage medium.

CROSS REFERENCE TO RELATED APPLICATIONS AND PATENTS

This application is related to other co-pending U.S. patent applications, namely application Ser. Nos. 08/341,251 entitled "Sampled Amplitude Read Channel Comprising Sample Estimation Equalization, Defect Scanning, Channel Quality, Digital Servo Demodulation, PID Filter for Timing Recovery, and DC Offset Control," 08/012,266 entitled "Synchronous Read Channel," 08/236,719 entitled "Method and Apparatus for Calibrating a PRML Read Channel Integrated Circuit," and 08/313,491 entitled "Improved Timing Recovery For Synchronous Partial Response Recording." This application is also related to several U.S. patents, namely U.S. Pat. Nos. 5,359,631 entitled "Timing Recovery Circuit for Synchronous Waveform Sampling," 5,291,499 entitled "Method and Apparatus for Reduced Complexity Viterbi-Type Sequence Detectors," 5,297,184 entitled "Gain Control Circuit for Synchronous Waveform Sampling," and 5,329,554 entitled "Digital Pulse Detector." All of the above-named patent applications and patents are assigned to the same entity, and all are incorporated herein by reference.

BACKGROUND OF THE INVENTION

In magnetic storage systems for computers, digital data serves to modulate the current in a read/write head coil so that a sequence of corresponding magnetic flux transitions are written onto a magnetic medium in concentric tracks. When reading this recorded data, the read/write head again passes over the magnetic medium and transduces the magnetic transitions into pulses in an analog signal that alternate in polarity. These pulses are then decoded by read channel circuitry to reproduce the digital data.

Decoding the pulses into a digital sequence can be performed by a simple peak detector in a conventional analog read channel or, as in more recent designs, by a discrete time sequence detector in a sampled amplitude read channel. Discrete time sequence detectors are preferred over simple analog pulse detectors because they compensate for intersymbol interference (ISI) and are less susceptible to noise. As a result, discrete time sequence detectors increase the capacity and reliability of the storage system. There are several well known discrete time sequence detection methods including discrete time pulse detection (DPD), partial response (PR) with Viterbi detection, maximum likelihood sequence detection (MLSD), decision-feedback equalization (DFE), enhanced decision-feedback equalization (EDFE), and fixed-delay tree-search with decision-feedback (FDTS/DF).

In conventional peak detection schemes, threshold crossing or derivative information, implemented in analog circuitry, is normally used to detect peaks in the continuous time analog signal generated by the read head. The analog read signal is "segmented" into bit cell periods and interpreted during these segments of time. The presence of a peak during the bit cell period is detected as a "1" bit, whereas the absence of a peak is detected as a "0" bit. The most common errors in detection occur when the bit cells are not correctly aligned with the analog pulse data. Timing recovery, then, adjusts the bit cell periods so that the peaks occur in the center of the bit cells on average in order to minimize detection errors. Since timing information is derived only when peaks are detected, the input data stream is normally run length limited (RLL) to limit the number of consecutive "0" bits.

Detection errors are also caused by intersymbol interference (ISI). Storage density is directly related to the number of pulses stored on the storage medium, and as the pulses are packed closer together in the effort to increase data density, they eventually interfere with each other resulting in intersymbol interference. This interference can cause a peak to shift out of its bit cell, or its magnitude to decrease, and result in a detection error. The ISI effect is reduced by decreasing the data density or by employing an encoding scheme to ensure that a minimum number of "0" bits occur between "1" bits. For example, a (d,k) run length limited (RLL) code constrains to d the minimum number of "0" bits between "1" bits, and to k the maximum number of consecutive "0" bits. A typical RLL (1,7) ⅔ rate code encodes 8 bit data words into 12 bit codewords to satisfy the (1,7) constraint.

Sampled amplitude detection, such as partial response (PR) with Viterbi detection, allows for increased data density by compensating for intersymbol interference and increasing channel noise immunity. Unlike conventional peak detection systems, sampled amplitude recording detects digital data by interpreting, at discrete time instances, the actual value of the pulse data. A sampling device samples the analog read signal at the baud rate (code bit rate) and an equalizing filter equalizes the sample values according to a desired partial response. A discrete time sequence detector, such as a Viterbi detector, interprets the equalized sample values in context to determine a most likely sequence for the data (i.e., maximum likelihood sequence detection MLSD). In this manner, the effect of ISI can be taken into account during the detection process thereby decreasing the probability of a detection error. After processing a consecutive sequence of sample values, the sequence detector compensates for ISI and channel noise by selecting the most likely digital sequence associated with the sample values. This increases the effective signal to noise ratio and, for a given (d,k) constraint, allows for significantly higher data density as compared to conventional analog peak detection read channels.

The application of sampled amplitude techniques to digital communication channels is well documented. See Y. Kabal and S. Pasupathy, "Partial Response Signaling", *IEEE Trans. Commun. Tech.*, Vol. COM-23, pp. 921"934, September 1975; and Edward A. Lee and David G. Messerschmitt, "Digital Communication", Kluwer Academic Publishers, Boston, 1990; and G. D. Forney, Jr., "The Viterbi Algorithm", *Proc. IEEE,* Vol. 61, pp. 268–278, March 1973.

Applying sampled amplitude techniques to magnetic storage systems is also well documented. See Roy D. Cideciyan, Francois Dolivo, Walter Hirt, and Wolfgang Schott, "A PRML System for Digital Magnetic Recording", *IEEE Journal on Selected Areas in Communications,* Vol. 10 No. 1, January 1992, pp. 38–56; and Wood et al, "Viterbi Detection of Class IV Partial Response on a Magnetic Recording Channel", *IEEE Trans. Commun.,* Vol. Com-34, No. 5, pp. 454–461, May 1986; and Coker et al, "Implementation of PRML in a Rigid Disk Drive", *IEEE Trans. on Magnetics,* Vol. 27, No. 6, November 1991; and Carley et al, "Adaptive Continuous-Time Equalization Followed By FDTS/DF Sequence Detection", *Digest of The Magnetic Recording Conference,* Aug. 15–17, 1994, pp. C3; and Moon et al, "Constrained-Complexity Equalizer Design for Fixed Delay Tree Search with Decision Feedback", *IEEE Trans. on Magnetics,* Vol. 30, No. 5, September 1994; and Abbott et al, "Timing Recovery For Adaptive Decision Feedback Equalization of The Magnetic Storage Channel", *Globecom'90 IEEE Global Telecommunications Conference* 1990, San Diego, Calif., November 1990, pp. 1794–1799; and Abbott et al, "Performance of Digital Magnetic Recording with Equalization and Offtrack Interference", *IEEE Transactions on Magnetics,* Vol. 27, No. 1, January 1991; and Cioffi et al, "Adaptive Equalization in Magnetic-Disk Storage Channels", *IEEE Communication Magazine,* February 1990; and Roger Wood, "Enhanced Decision Feedback Equalization", *Intermag'90.*

Defects

After a recording media is manufactured, it is tested to determine the validity of each sector. During the manufacturing process, defects can damage a sector and prevent data from being reliably stored in or retrieved from that sector. Defects are flaws within the media, usually resulting from the presence of dust particles or other aberrations during the manufacturing process, that make a portion of the media unsuitable for the storage of information. These defects may be minute pinholes or asperities caused by the failure of the coating, plating or sputtering processes used to apply the medium to the disk surface or by the embedding of foreign particles into the coating.

The number of areas on a disk which cannot store data reliably increases as the storage capacity per unit area of the disk drive system increases. Therefore, as the data density is increased, it becomes more difficult and expensive to manufacture flawless storage devices. It also becomes cost prohibitive to discard all of the flawed devices. For these reasons it is desirable to develop a scheme which allows a system with defects occurring on its media to be saved and not discarded.

The defective sectors detected after the manufacturing process are stored in a list of defects, known as the "primary defect list" or "manufacturer's defect list." This list is stored directly on the disk in a reserved space, usually outside of the boundaries of the data tracks. Additional defective sectors, known as secondary or "grown" defects may be detected after the manufacturer's primary list has been compiled. A list of these "grown" defects is maintained and stored in a secondary defect list also on the disk in a reserved space.

The primary and secondary lists are read from the disk and stored in the random access memory (RAM) upon power up of the disk drive system. The system controller then uses the information from the primary and secondary lists to manage the defects and avoid writing data to bad or defective sectors.

A conventional method for determining the location of defects on the disk and generating the primary defect list after the disk drive system has been assembled and sealed, is to connect the disk drive system to an analog scan station as taught by U.S. Pat. No. 4,914,530 issued to Graham et al. This process is typically performed in a clean room environment within a disk drive assembly or field maintenance facility. To identify defects on the disk a predetermined data sequence (typically a square wave of fixed frequency) is first recorded on the tracks within a zone of the disk, at a rate related to the nominal data transfer rate for that zone. The data sequence recorded is chosen such that the analog read back signal is substantially sinusoidal. The tracks of the zone are then scanned by an analog scan process which monitors unexpected deviations in the analog signal pattern such as amplitude drop ins, drop outs, and phase shifts. If variances, beyond nominal limits, in the analog signal pattern are detected, the track and the location of the defect within the track are recorded in a computer memory associated with the analog scan station. This process is repeated for each zone on the disk using a nominal data transfer rate corresponding to the particular zone.

Once all of the zones on the disk have been scanned for defects, the analog scan station's computer assembles all of the recorded defects together and from this data prepares the primary defect list. Once compiled, the primary defect list is then written by the analog scan station's computer onto a reserved track on the disk, usually a track outside of the outermost data track. Once the primary defect list is written on the disk, the disk drive is disconnected from the analog scan station.

A DC erase signal can also be used in place of the sinusoidal analog scan signal to identify defects on the disk. The DC erase signal is effectively the voltage signal corresponding to a logical "0" bit stored on the disk. Defects are identified, when the disk is read, at locations where the signal is greater than a logical "0" bit voltage level. Again, defects are flagged, recorded by the scan station's computer, and later compiled within the primary defect list stored on the disk.

Once the primary defect list is compiled and stored on the disk, the disk drive is formatted by reading the primary defect list from the disk and mapping the logical sequence of the sectors according to the location of the defective sectors. Many schemes have been used to map the logical sequence of the sectors, either by skipping over the defective sectors or mapping them to a spare sector somewhere else within the track, zone or disk. Once the disk is formatted by the manufacturer and the logical sequence of the sectors have been mapped, the manufacturing of the disk drive system is complete and the disk drive system can ultimately be connected for use in a computer system.

Another method for detecting defects, disclosed in U.S. Pat. No. 5,247,254 issued to Huber et al, incorporates a defect detection system directly within the analog peak detection read channel of the storage system. This obviates the more expensive external scanning stations and provides a means to scan the media for defects periodically during the drive's normal operation. Consequently, defects in the media that occur over time can be detected and avoided. The Huber patent employs analog quadrature detection including a means for squaring the quadrature components and summing the results to generate a flaw signal related to the location of defects.

The prior art defect scanning techniques for analog peak detection storage systems are not easily implemented nor cost effective for use in amplitude sampling storage systems. Conventional analog scanning stations are expensive and cannot check for defects in the media throughout the lifetime of the storage device. Further, the defect scanning methods employed in analog peak detection read channels are not easily incorporated into a discrete time sampled amplitude read channel implemented as a single mixed signal integrated circuit (IC). Sampled amplitude read channels operate with discrete time circuits (and commonly digital circuits) which, being programmable, are highly configurable and adaptable. It is inefficient to incorporate the conventional analog defect detection circuits into a sampled amplitude read channel when programmable discrete time techniques can be implemented instead. Further, the discrete time circuitry already incorporated within a sampled amplitude read channel, such as an analog-to-digital converter, can also be used to implement defect scanning. Sharing the discrete time circuitry is a more cost effective implementation since it requires less die area and less power. Another drawback overcome by the present invention is the inability of prior art devices to detect and distinguish between multiple types of media defects. Finally, the prior art defect scanning systems incorporated within a read channel cannot be programmably adapted to operate according to the various disk drives, data densities, and magnetic media found in the market. Nor can the prior art defect scanning systems be programmably adapted to compensate for changes in the disk drive that occur over time.

It is a general object of the present invention to provide an apparatus and method which does not rely on an analog scan station and which allows a disk drive, using a sampled amplitude read channel, to scan the disk, determine the location of defects, generate the primary defect list, and format the disk according to the location of the defects on the disk. Another object is to implement a defect detection technique using discrete time signal processing in order to advantageously share the discrete time circuitry already incorporated within a sampled amplitude read channel. Still another object is to optimize the defect detection process through programmable adjustments of system parameters. A further object is to detect the approximate byte location within a sector where a defect occurs, and to mark that byte location as bad rather than the entire sector. Yet another object is to detect and distinguish between various types of media defects. Another object is to programmably adapt the defect scanning system so that it may operate in various types of disk drives, at various data rates, and with various types of magnetic media, thereby obviating customization of the read channel during manufacturing.

SUMMARY OF THE INVENTION

The objects of the present invention are achieved by incorporating into a sampled amplitude read channel a real time defect scanning system within a sampled amplitude read channel for detecting defects in a magnetic media of a disk drive. The scanning system operates by writing a predetermined bit sequence to the storage device and detecting distortions in the analog read signal upon read back. The bit sequence is chosen so that, in the absence of noise and defects, the analog read signal is either substantially sinusoidal or DC. The read back signal is sampled at a predetermined frequency and media defects are detected using discrete time signal processing. In sinusoidal read signal mode, a discrete time notch filter removes the fundamental and harmonic frequencies so that any remaining sidebands indicate a media defect. In both sinusoidal and DC read signal modes, a discrete time defect filter having an impulse response substantially matched to the signal noise caused by the media defect enhances the signal so that a defect can be detected with a discrete time energy detector. A defect is detected when the signal exceeds a programmable threshold in the energy detector. A plurality of discrete time filters having different defect detecting impulse responses can be employed to detect and distinguish between different types of media defects. Also, the thresholds in the energy detectors are programmable so that the media can be read multiple times using different predetermined thresholds in order to optimize the detection process. The impulse responses of the notch filter and defect detection filter are programmable in order to adapt the defect scanning system to a particular disk drive, data density, or magnetic media.

BRIEF DESCRIPTION OF THE DRAWINGS

The above and other aspects and advantages of the present invention will be better understood by reading the following detailed description of the invention in conjunction with the drawings wherein.

DETAILED DESCRIPTION OF THE PREFERRED EMBODIMENT

Sampled Amplitude Recording Channel

Figure 1:
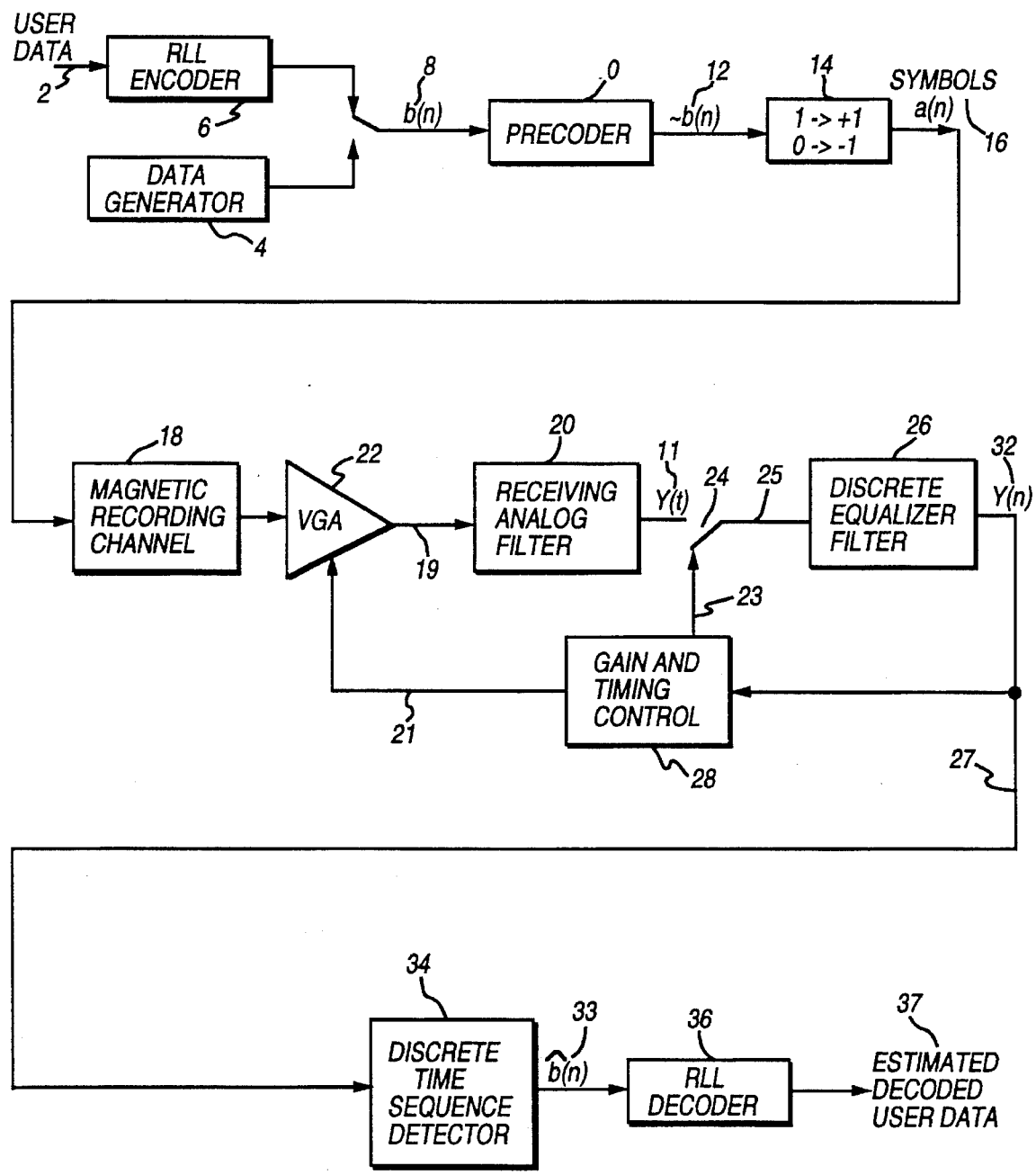
FIG. 1 is a block diagram of a conventional sampled amplitude recording channel.

FIG. 1 is a detailed block diagram of a conventional sampled amplitude read/write recording channel. During a write operation, either user data 2 or preamble data from a data generator 4 (for example 2T preamble data) is written onto the media. A RLL encoder 6 encodes the user data 2 into a binary sequence b(n) 8 according to an RLL constraint. A precoder 10 precodes the binary sequence b(n) 8 in order to compensate for the transfer function of the recording channel 18 and equalizing filters to form a precoded sequence ~b(n) 12. The precoded sequence ~b(n) 12 is converted into symbols a(n) 16 by translating 14 ~b(N)=0 into a(N)=−1, and ~b(N)=1 into a(N)=+1. The symbols a(n) 16 modulate the current in the recording head coil at the baud rate 1/T to record the binary sequence onto the magnetic media.

When reading the binary sequence back, a variable gain amplifier 22 adjusts the amplitude of the analog read signal 19, and an analog filter 20 provides initial equalization toward the desired response. A sampling device 24 samples the analog read signal Y(t) 11 from the analog filter 20, and a discrete time filter 26 provides further equalization toward the desired response. In partial response recording, for example, the desired response is often selected from Table 1.

The equalized sample values 32 are applied over line 27 to decision directed gain and timing control 28 for adjusting the amplitude of the read signal and the frequency and phase of the sampling device 24, respectively. Timing recovery adjusts the frequency of sampling device 24 over line 23 in order to synchronize the equalized samples 32 to the waveform (see co-pending U.S. patent application 08/313,491 entitled "Improved Timing Recovery For Synchronous Partial Response Recording"). Gain control adjusts the gain of variable gain amplifier 22 over line 21. The equalized samples Y(n) 32 are sent to a discrete time sequence detector 34, such as a maximum likelihood (ML) Viterbi sequence detector, to detect an estimated binary sequence ^b(n) 33. An RLL decoder 36 decodes the estimated binary sequence ^b(n) 33 into estimated user data 37. In the absence of errors, the estimated binary sequence ^b(n) 33 is equal to the recorded binary sequence b(n) 8, and the decoded user data 37 is equal to the recorded user data 2.

Data Format

Figure 2A:
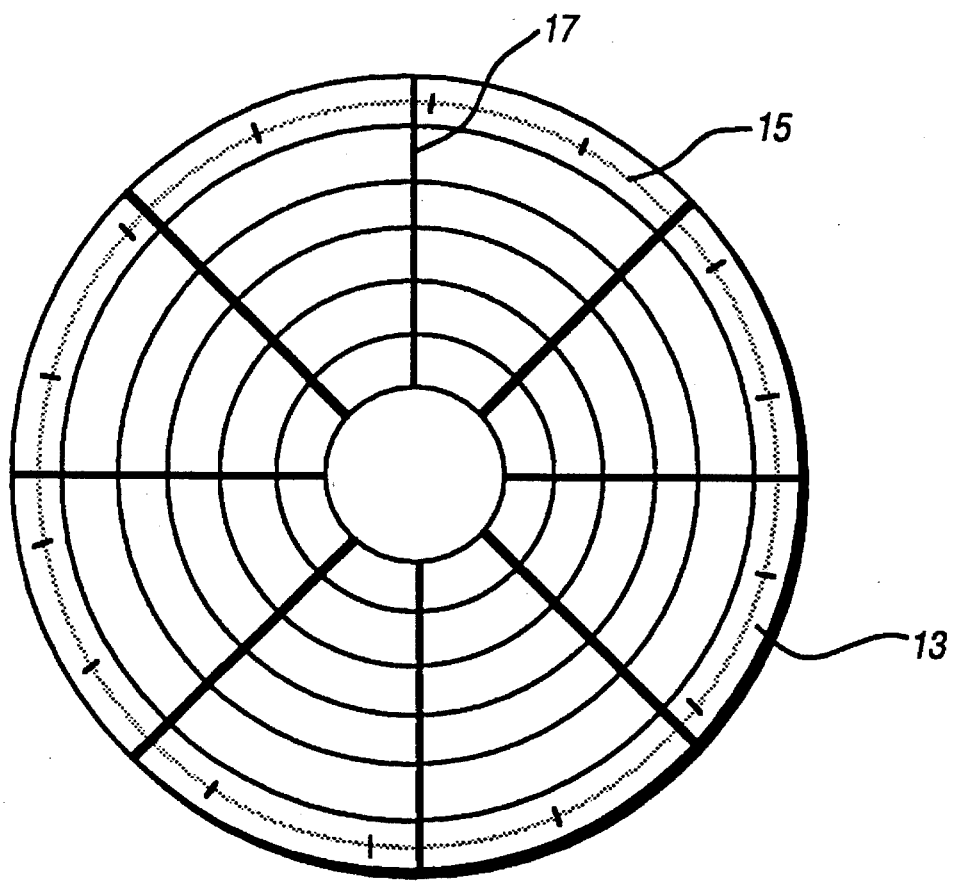
FIG. 2A shows an exemplary data format of a magnetic disk having a plurality of concentric tracks where each track contains a plurality of sectors.
Figure 2B:
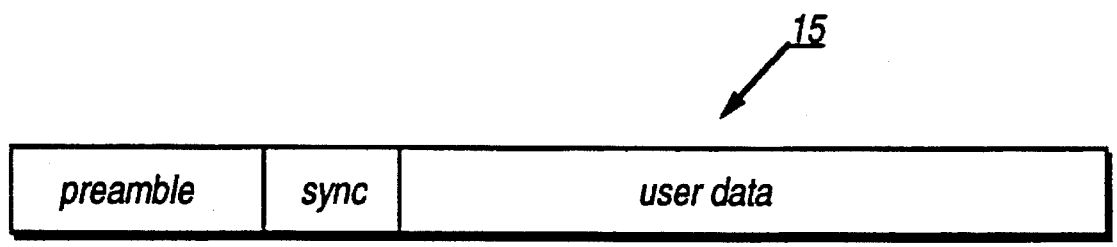
FIG. 2B shows an exemplary format of a sector.

FIG. 2A shows an exemplary data format of a magnetic media comprising a plurality of concentric data tracks 13 wherein each data track 13 is comprised of a plurality of sectors 15, and wherein a plurality of servo fields 17 are embedded in the sectors. The servo fields 17 are processed to verify the track and sector position of the read/write head. Additionally, servo bursts within the servo field 17 are processed to keep the head aligned over the desired track 13 while writing and reading data. FIG. 2B shows the format of a sector 15 comprising a acquisition preamble, a sync mark, and user data. Timing recovery uses the acquisition preamble to acquire the correct sampling frequency and phase, and the sync mark signals the beginning of user data. See co-pending U.S. patent application 08/313,491 entitled "Improved Timing Recovery For Synchronous Partial Response Recording".

Defect Scans

Figure 3:
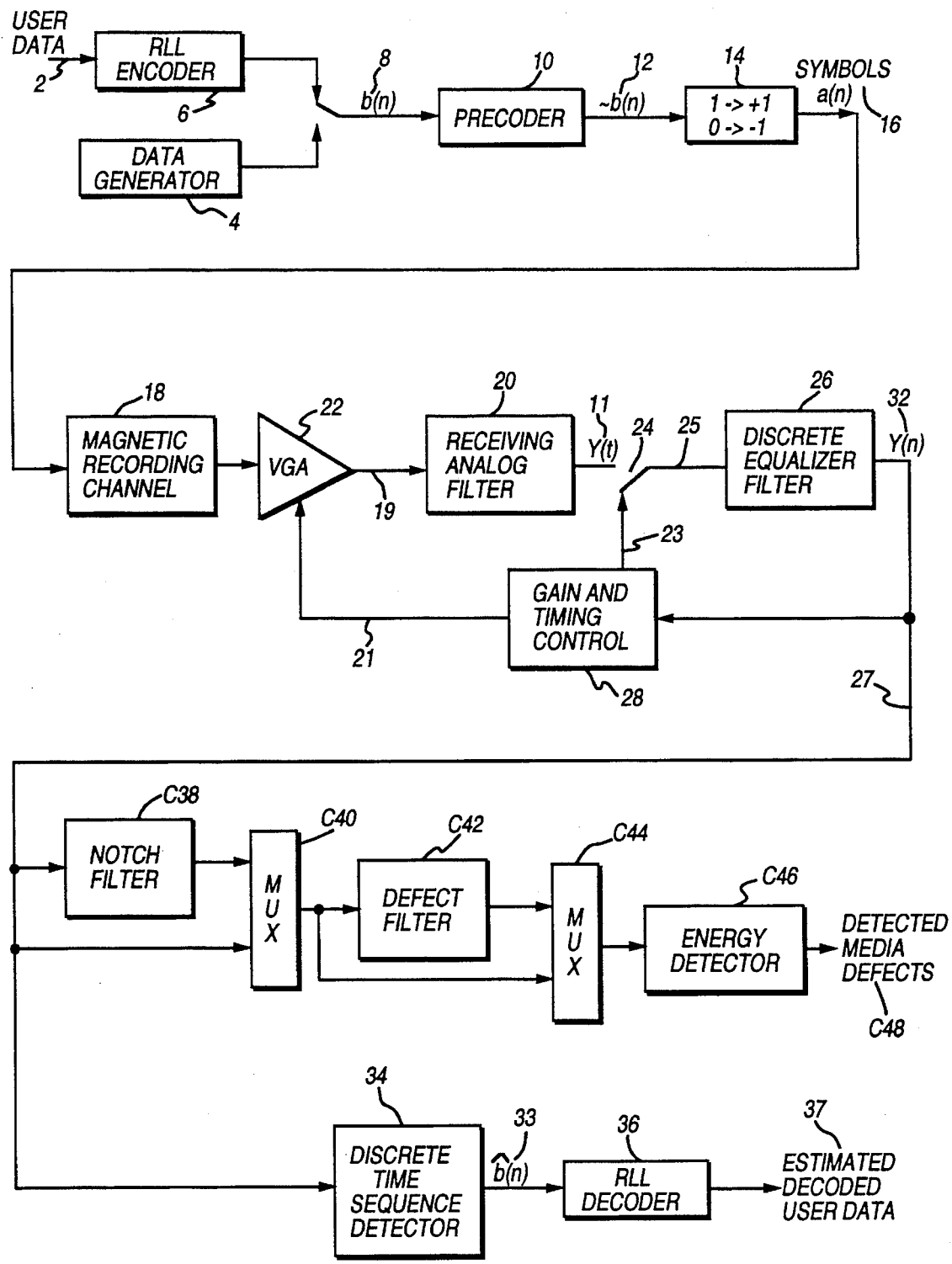
FIG. 3 is a block diagram of a sampled amplitude recording channel comprising the defect detection components of the present invention.

FIG. 3 shows a sampled amplitude read channel comprising the defect scan system of the present invention. The defect scan system comprises a notch filter C38, a defect detection filter C42, and an energy detector C46. When in DC scan mode, multiplexor C40 is programmed so that the read back signal bypasses the notch filter. The defect filter C42 can also be bypassed through multiplexor C44 so that the data representing media defects is input directly into the energy detector C46. The output C48 of the energy detector C46 is transmitted to a disk controller for flagging corresponding areas of the media as defective.

The defect scan system of the present invention operates in either an asynchronous or synchronous sampling mode. The asynchronous mode samples the read signal waveform without being synchronized (phase locked) to the baud rate. In synchronous mode, the defect scan is delayed until timing recovery has synchronized the waveform sampling using the preamble.

In either mode, the servo fields must first be pre-recorded before defect scanning in order to verify the position of the read/write head. In asynchronous mode, the defect scanning system processes the entire sector (preamble area, sync area, and user data area). However, the exact location of a media defect within the user data field cannot be determined before the preamble and sync fields are recorded because these field lengths are programmable. Conversely, when defect scanning synchronously, the exact location of a media defect within the user data field can be determined, but media defects in the preamble and sync fields cannot be detected.

Therefore, in the preferred embodiment, defect scans are first performed asynchronously to determine if any media defects are present within a sector, and then a synchronous defect scan determines the exact location of media defects within the user data field. Also in the preferred embodiment, the sampled amplitude recording channel is calibrated before scanning for defects. The preferred method, then, to perform a defect scan comprises the steps of:

1. pre-recording the servo field information onto the media;

2. calibrating the recording channel according to the desired response (e.g., PR4, EPR4, EEPR4, etc.; see co-pending U.S. patent application 08/236,719 entitled "Method and Apparatus for Calibrating a PRML Read Channel Integrated Circuit");

3. scanning the media asynchronously for defects in the preamble, sync, and user data fields;

4. scanning the media synchronously to determine exact location of media defects within the user data field.

Figure 4A:
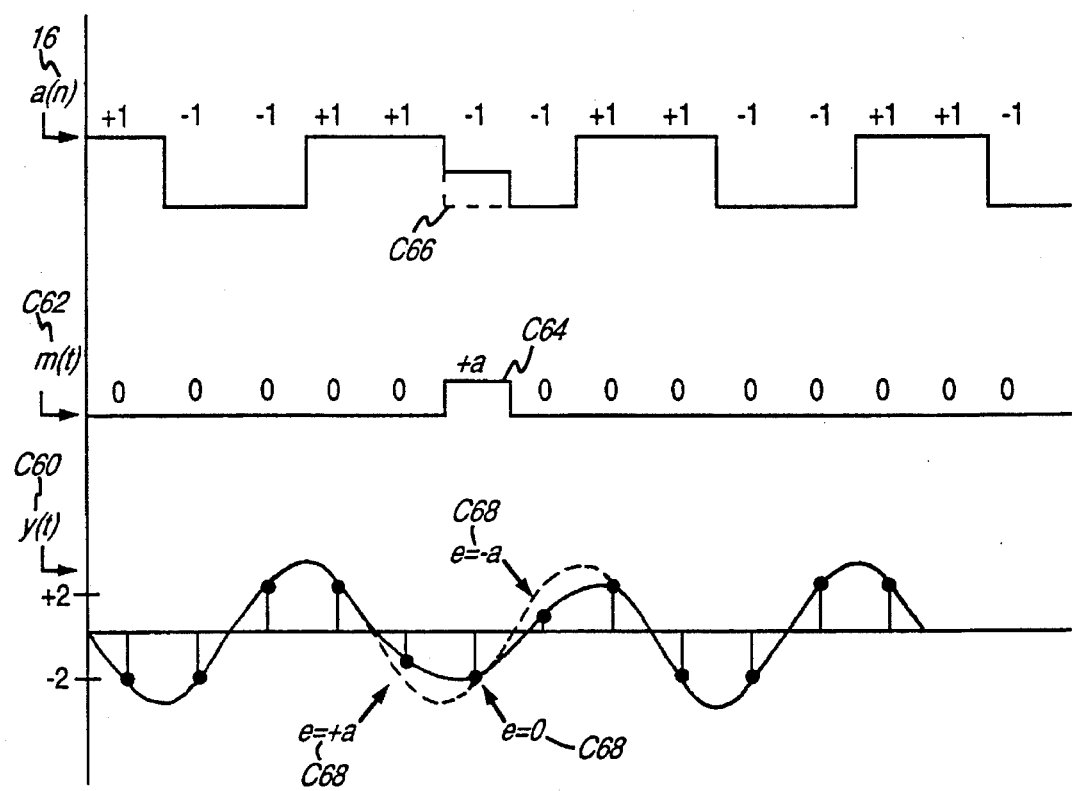
FIG. 4A shows a 2T preamble written to the disk during a defect scan and the resulting read back sinusoidal waveform when a defect occurs.
Figure 4B:
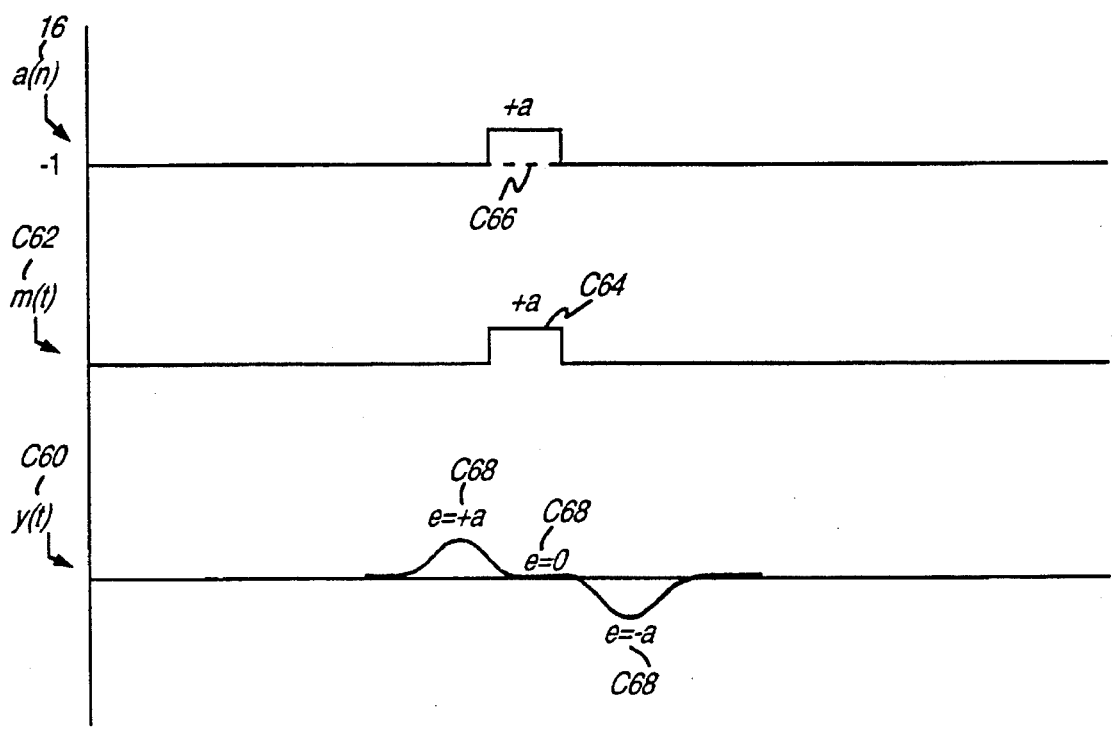
FIG. 4B shows a DC signal written to the disk during a defect scan and the resulting read back signal waveform when a defect occurs.

FIGS. 4A and 4B illustrate the effect of a media defect on the read back signal. FIG. 4A illustrates the effect of a media defect when the read back signal is sinusoidal. To achieve a sinusoidal read back signal, 2T scan data (. . . +1,+1,−1,−1,+1,+1,−1,−1, . . . ) is used as the write symbols a(n) 16. In the absence of noise and defects, 2T data results in a substantially sinusoidal read back signal y(t) C60. A common defect is an area of the media that can no longer be magnetized due to a dust particle or other aberration. This type of defect can be modeled as a pulse C64 having a finite amplitude and finite width m(t) C62 which causes a drop out in the write signal C66 and errors C68 in the sinusoidal read back signal y(t). If the fundamental frequency and harmonics are filtered out of the read back signal y(t), only the errors indicating the media defect remain. A defect filter with an impulse response matched to the error signature can amplify the errors so that the defect is more readily detected. A similar result occurs when the write sequence a(n) 16 is a DC level signal (+1 or −1) as shown in FIG. 4B.

Figure 5A:
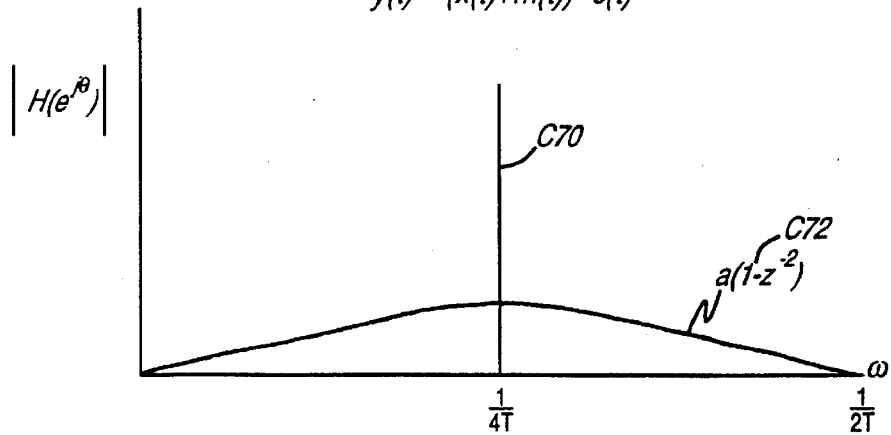
FIGS. 5A, 5B, and 5C show the defect scanning process of FIG. 4A in the frequency domain.
Figure 5B:
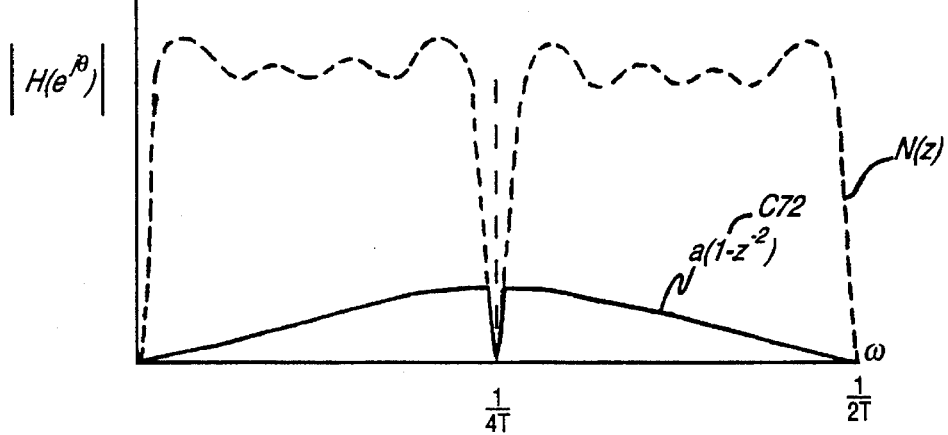
Figure 5C:
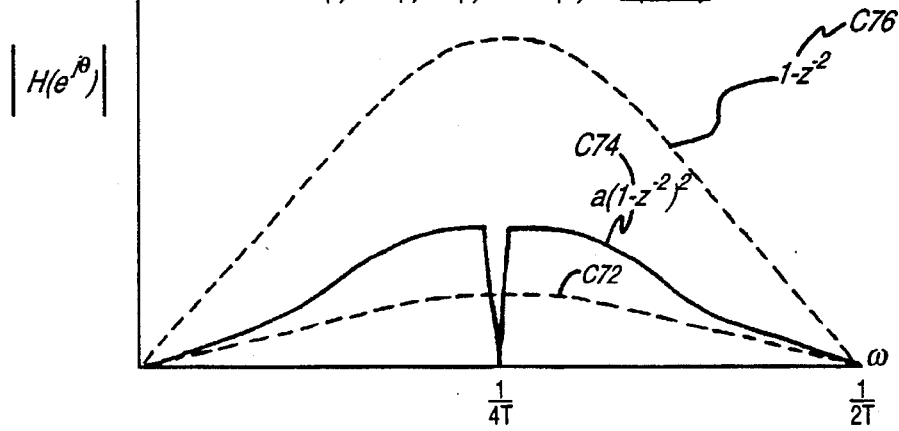

The signature of the error signal corresponding to a media defect can be modeled as the dipulse response of the recording channel. The dipulse response of the recording channel is the response to switching the write current on and off for a finite time which has a similar effect as a media defect m(t) C62. For instance, in a PR4 channel $(1-D^{-2})$ the dipulse response is {. . . 0,+1,0,−1,0 . . . }; the error signature is modeled {. . . 0,+a,0, −a0 . . . } as shown in FIGS. 5A, 5B, and 5C. One embodiment for the defect filter, then, is a filter matched to the response of the recording channel as shown in Table 1. For a PR4 channel, the defect filter C42 in the z-domain is: $1-Z^{-2}$.

FIGS. C4A, C4B, and C4C illustrate the defect scanning process in the frequency domain. When the write signal is 2T, the output of the recording channel y(t) comprises the fundamental frequency C70 of the sinusoid having sidebands $a(1-z^2)$ C72 corresponding to the media defects as shown in FIG. 5A. After filtering out the fundamental and harmonic frequencies, only the sidebands $a(1-Z^{-2})$ C72 remain as shown in FIG. 5B. FIG. 5C shows the sidebands $a(1-Z^{-2})$ C72 enhanced to $a(1-Z^{-2})^2$ C74 by the defect filter $1-Z^2$ C76. Defects are detected when the output of the defect filter exceeds a predetermined threshold.

Figure 8:
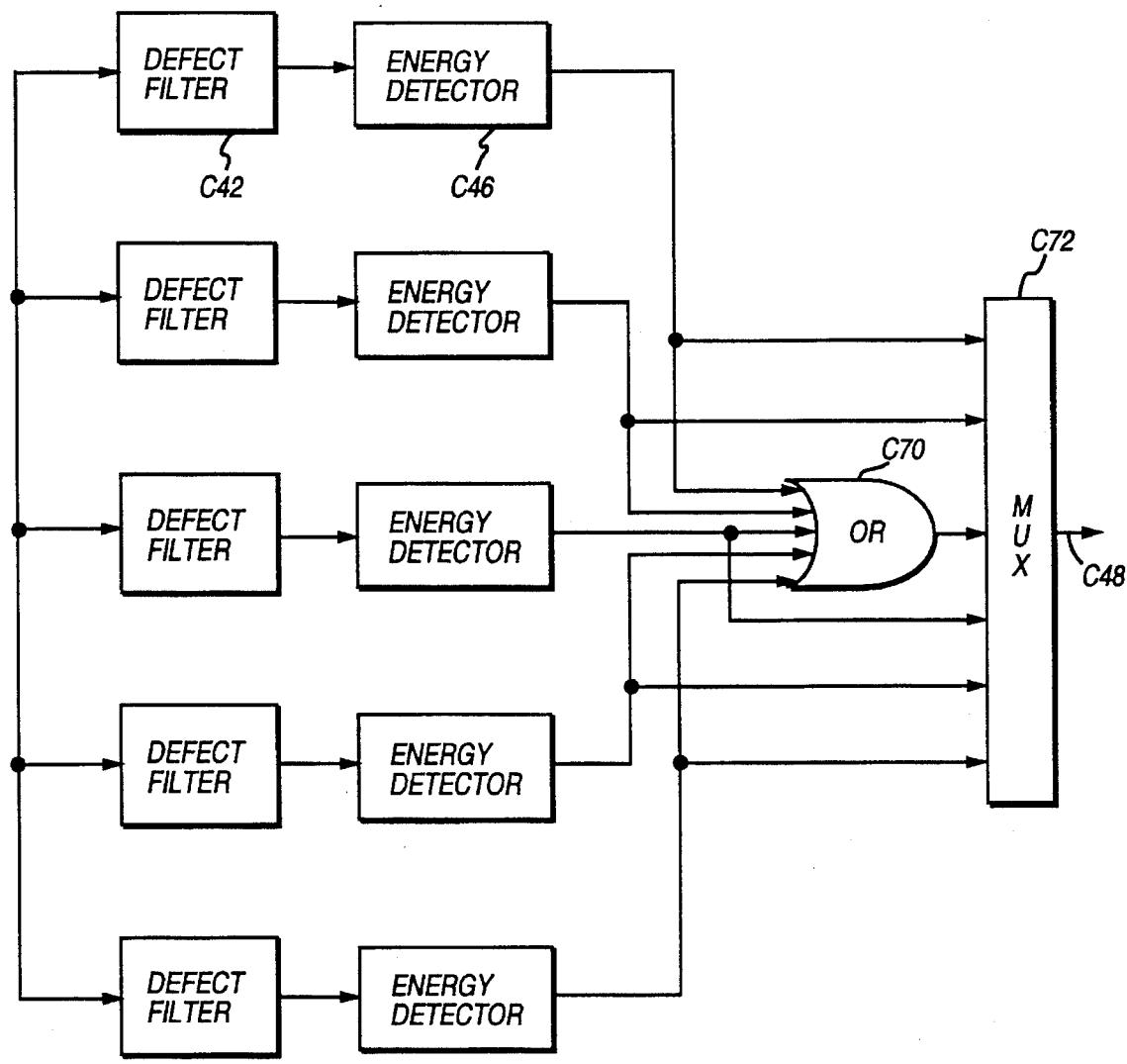
FIG. 8 shows a block diagram of a plurality of defect detection filters and energy detectors connected in parallel for distinguishing between different types of media defects.

The pulse model of a defect is not always accurate and the error signature will not always match the dipulse response of the channel. There may be several types of media defects each having their own error signature in the read back signal. In one embodiment, multiple defect filters are connected in parallel as shown in FIG. 8. The impulse response of each defect filter C42 is matched to a corresponding error signature caused by a particular media defect. Each defect filter C42 may also be output to an energy detector C46 with programmable thresholds. A multiplexor C72 selects the outputs of the energy detectors separately, or the combined outputs through an OR gate C70. In an alternative embodiment, the defect detection filter C42 comprises a plurality of programmable coefficients for adjusting the impulse response to the noise signature of a media defect.

Before a magnetic disk can be scanned for defects using the present invention, embedded servo fields must be pre-recorded on the media so that the position of the read/write head can be determined. The servo field comprises information related to the track and sector position of the read/write head. The servo field also contains servo burst information utilized by a servo control system to keep the head aligned over the desired track. Methods such as a laser interferometer head positioning system for pre-recording servo fields onto a magnetic disk are well known in the art. After the servo fields have been recorded onto the disk, the servo track-following system can be initiated.

Before scanning the media for defects, it is necessary to calibrate the read channel in order to tune the components therein to the desired response. For instance, the programmable parameters of the discrete time equalizer 26 and filters in gain and timing control 28 must be adjusted to appropriate settings. An example method for calibrating the read channel is described in U.S. patent application Ser. No. 08/236,719 entitled "Method and Apparatus for Calibrating a PRML Read Channel Integrated Circuit". After the channel has been calibrated, the media is scanned asynchronously to detect defects over the entire sector, including the preamble and sync fields, and any defects detected are saved by the disk controller. Then, the media may be scanned synchronously to detect defects in the user data field with a high degree of position accuracy. Any defects in the user data field are flagged by the disk controller and skipped over during normal operation rather than marking the entire sector as bad. If a sector is marked defective during the asynchronous scan but there are no defects in the user data field (a defective preamble and/or sync field), then the disk controller may mark the entire sector as bad depending on the number and extent of the defects.

To generate the 2T write data when defect scanning in sinusoidal read back mode, a data generator 4 is selected as the input to the precoder 10 (see FIG. 3). The sequence generated depends on the type of channel employed. For instance, in a PR4 recording channel wherein the precoder 10 is a $1/(1-D^2)$ MOD 2 filter, the data generator 4 outputs all "1"s to generate the 2T write signal a(n) 16 {. . . −1,−1,+1,+1,−1,−1,+1,+1,. . . }. During read back, the sampling device 24 is locked to a nominal frequency (the baud rate) by the timing control circuit 28. Copending U.S. patent application Ser. No. 08/313,491 entitled "Improved Timing Recovery For Synchronous Partial Response Recording" discloses the preferred method for locking the sampling frequency to the desired reference frequency. Once the sampling device is locked onto the nominal frequency, the fundamental and harmonics of the 2T read back signal are removed and the remaining errors caused by media defects are detected by the defect filter C42 and energy detector C46.

Figure 6A:
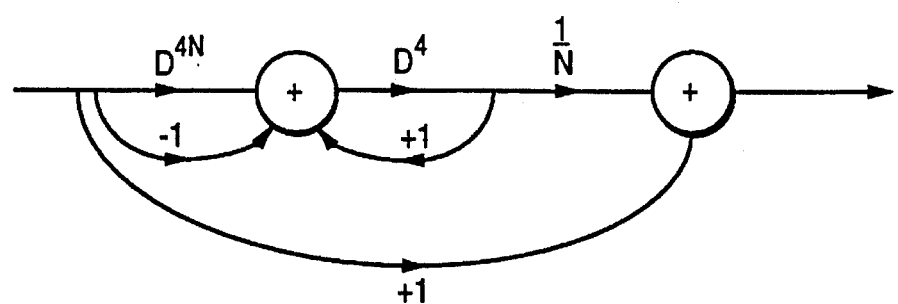
FIGS. 6A and 6B show the impulse response, implementation, and frequency response of the notch filter for defect scanning.
Figure 6B:
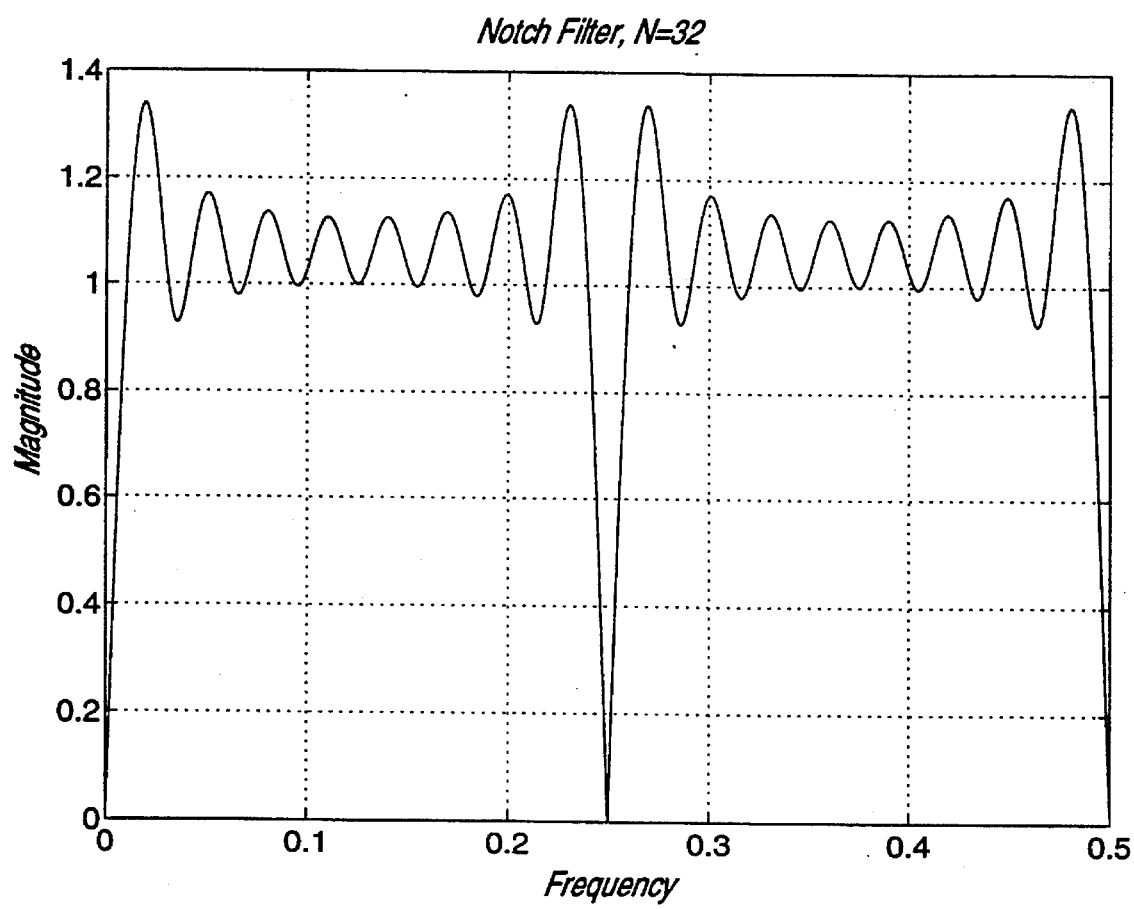

One way to filter out the fundamental and harmonic frequencies of the sinusoidal read back signal is through a discrete time notch filter C38. FIG. 6A shows an implementation of the preferred discrete time notch filter and its corresponding impulse response, with its frequency response shown in FIG. 6B. The z-domain representation of the notch filter C38 is:

$$H(z) = 1 + \frac{(Z^{-4}*(Z^{-4N}-1))}{N*(1-z^{-4})}$$

where N is programmable and determines the length of the impulse response:
h(k)={1,0,0,0,−1/N,0,0,0,−1/N,0,0,0,−1/N . . . 0,0,0,−1/N}
k=0,1,2,3, 4, 5,6,7, 8, 9, . . . 4N.

The frequency response of the notch filter C38 is programmable to compensate for variations in the storage system parameters. For disk drives with more fluctuations in disk speed or errors in locking to the nominal reference frequency, the width of the notch filter C38 is increased (N decreased) to ensure attenuation of the fundamental frequency. However, the accuracy of defect detection degrades with a wider notch filter since the spectrum corresponding to defects will also be attenuated. Repeating defect scans with different notch filter widths can optimize the defect detection process.

Another method of filtering out the fundamental frequency of the sinusoidal read back signal is to generate and subtract expected sample values from the read signal sample values when scanning synchronously. A method for generating the expected synchronized sample values is disclosed in U.S. patent application Ser. No. 08/340,939 entitled "Channel Quality Circuit In A Partial Sampled Amplitude Read Channel". As taught in that patent application, after subtracting the expected sample values from the read signal sample values, the resulting sample error signal is filtered with the defect filter of the present invention to detect media defects. The drawback with this method of defect scanning is that it is synchronous; errors in the preamble or sync fields cannot be detected.

When defect scanning in DC read back mode, multiplexor C40 of FIG. 3 may be programmed so that the read signal bypasses the discrete time notch filter. Multiplexor C44 is programmed to select, as input into the energy detector C46, either the read back signal directly or the read back signal enhanced by the defect filter C42. This allows for the greatest flexibility in order to optimize the defect scanning process.

Figure 7:
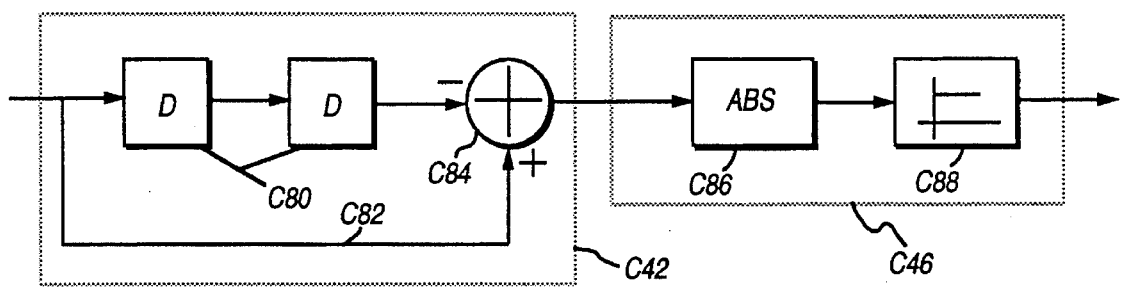
FIG. 7 is a detailed diagram of a defect detection filter and energy detector.

An embodiment for the defect filter C42 and energy detector C46 is shown in FIG. 7. The defect filter C42 comprises an adder C84 for adding the read back signal y(n) C32 received over line C82 with the read back signal y(n) delayed through two registers C80. The corresponding impulse response for this defect filter C42 is:

$$H(Z)=1-Z^{-2}.$$

The energy detector C46 comprises an absolute value circuit C86 for rectifying the filtered read back signal and a threshold comparator circuit C88. A defect is detected when the rectified read back signal exceeds the threshold. The threshold of the threshold comparator circuit C88 is programmable in order to optimize the defect scanning process.

The objects of the invention have been fully realized through the embodiment disclosed herein. Those skilled in the art will appreciate that the aspects of the invention can be achieved through various embodiments without departing from the spirit and scope of the invention. The particular embodiment disclosed is illustrative and not meant to limit the scope of the invention as appropriately construed by the following claims.

TABLE 1

| Channel | Transfer Function | Dipulse Response |
| --- | --- | --- |
| PR4 | (1 − D) (1 + D) | 0, 1, 0, −1, 0, 0, 0, ... |
| EPR4 | (1 − D) (1 + D)² | 0, 1, 1, −1, −1, 0, 0, ... |
| EEPR4 | (1 − D) (1 + D)³ | 0, 1, 2, 0, −2, −1, 0, ... |

We claim:

1. A sampled amplitude read channel for reading data stored on a magnetic medium by detecting digital data from a sequence of discrete time sample values generated by sampling pulses in an analog signal from a magnetic read head positioned over the magnetic medium, said sampled amplitude read channel comprising:
   (a) a sampling device for sampling the analog signal to generate the discrete time sample values;
   (b) a discrete time sequence detector, responsive to the discrete time sample values, for detecting the data stored on the magnetic medium; and
   (c) a discrete time defect detection filter, responsive to the discrete time sample values, wherein an impulse response of the defect detection filter substantially matches an error signature in the discrete time sample values corresponding to a defect in the magnetic medium.

2. The sampled amplitude read channel as recited in claim 1, wherein the defect detection filter comprises a plurality of programmable coefficients for adjusting the impulse response.

3. The sampled amplitude read channel as recited in claim 1, further comprising a data generator for writing a predetermined sequence of data onto the magnetic medium.

4. The sampled amplitude read channel as recited in claim 1, wherein:
   (a) the data stored on the magnetic medium is binary data alternating in value at a predetermined frequency; and
   (b) the analog signal from the magnetic read head is a substantially sinusoidal signal.

5. The sampled amplitude read channel as recited in claim 4, further comprising a discrete time notch filter responsive to the discrete time sample values for filtering out fundamental and harmonic frequencies of the sinusoidal signal.

6. The sampled amplitude read channel as recited in claim 5, wherein a frequency response of the notch filter is programmable.

7. The sampled amplitude read channel as recited in claim 6, wherein the frequency response of the notch filter is equal to:

$$H(z) = 1 + \frac{(Z^{-4}*(Z^{-4N} - 1))}{N*(1 - z^{-4})}$$

wherein N is a programmable integer $\geq 1$.

8. The sampled amplitude read channel as recited in claim 1, wherein:
   (a) the data stored on the magnetic medium is binary data with each bit having an equal value; and
   (b) the analog signal from the magnetic read head is substantially a constant DC signal.

9. The sampled amplitude read channel as recited in claim 1, wherein the impulse response of the defect detection filter substantially matches a dipulse response of the recording channel.

10. The sampled amplitude read channel as recited in claim 9, wherein the impulse response of the defect detection filter is selected from the group consisting of PR4, EPR4 and EEPR4.

11. The sampled amplitude read channel as recited in claim 1, further comprising an energy detector circuit for rectifying filtered sample values from the defect detection filter and comparing the rectified sample values to a threshold wherein a defect in the magnetic medium is detected when the threshold is exceeded.

12. The sampled amplitude read channel as recited in claim 11, wherein the threshold is programmable.

13. The sampled amplitude read channel as recited in claim 1, further comprising a timing recovery circuit for synchronizing the sampling of the analog signal to a predetermined baud rate used to store the data to the magnetic medium wherein:
   (a) the data on the magnetic medium is stored in one or more sectors wherein each sector comprises a preamble field, a sync field, and a user data field;
   (b) the timing recovery circuit processes the preamble field to lock to a correct sampling phase and frequency;
   (c) the timing recovery circuit processes the sync field to determine a beginning of the user data field; and
   (d) the error signature enhanced by the defect detection filter is synchronous to the baud rate and processed to detect medium defects corresponding to a particular location in the user data field after the sync field has been detected.

14. The sampled amplitude read channel as recited in claim 1, further comprising a timing recovery circuit for synchronizing the sampling of the analog signal to a predetermined baud rate used to store the data to the magnetic medium wherein:
   (a) the data on the magnetic medium is stored in one or more sectors wherein each sector comprises a preamble field, a sync field, and a user data field;
   (b) the timing recovery circuit processes the preamble field to lock to a correct sampling phase and frequency;
   (c) the timing recovery circuit processes the sync field to determine a beginning of the user data field; and
   (d) the error signature enhanced by the defect detection filter is asynchronous to the baud rate and processed to detect medium defects within the entire sector.

15. The sampled amplitude read channel as recited in claim 1, further comprising a plurality of defect detection filters wherein an impulse response of each defect filter substantially matches a corresponding error signature caused by a particular medium defect.

16. The sampled amplitude read channel as recited in claim 15, further comprising a means for combining the outputs of the defect detection filters to form a combined output indicative of any one of the medium defects.

17. A method of detecting defects in a magnetic medium within a magnetic recording device comprising a sampled amplitude read channel in a discrete time recording channel, the sampled amplitude read channel for reading data stored on the magnetic medium by detecting digital data from a sequence of discrete time sample values generated by sampling pulses in an analog signal from a magnetic read head positioned over the magnetic medium, said method for detecting defects comprising the steps of:
   (a) writing a predetermined sequence of data onto the magnetic medium at a predetermined baud rate;
   (b) reading the data from the magnetic medium using the read head to generate the analog signal;

(c) sampling the analog signal from the read head to generate the sequence of discrete time sample values; and (d) enhancing an error signature in the sequence of discrete time sample values corresponding to a defect in the magnetic medium using a discrete time defect detection filter having an impulse response substantially matched to the error signature.

18. The defect detection method as recited in claim 17, wherein the predetermined sequence of data written to the magnetic medium causes the analog signal generated from the magnetic read head to be substantially sinusoidal.

19. The defect detection method as recited in claim 18, further comprising the step of removing fundamental and harmonic frequencies of the substantially sinusoidal signal from the sequence of discrete time sample values.

20. The defect detection method as recited in claim 17, wherein the magnetic medium comprises a plurality of concentric data tracks each comprising a plurality of data sectors, wherein the defect detection method further comprises, before steps (a) to (d), the steps of:

(e) embedding a servo field within at least one of the data sectors; and (f) calibrating the sampled amplitude read channel according to a desired response.

21. The defect detection method as recited in claim 17, wherein the magnetic medium comprises a plurality of concentric data tracks comprising a plurality of data sectors having at least one embedded servo field, said defect detection method further comprising the steps of:

(e) repeating steps (a) through (d) wherein:
the data in step (a) is written over an entire sector and not over the servo field; and
the error signature enhanced by the defect filter in step (d) is asynchronous to the baud rate and processed to detect medium defects within the entire sector;

(f) recording a preamble sequence and a sync mark at a beginning of the sector, wherein a remainder of the sector is a user data field; and (g) repeating steps (a) through (d) wherein:
the data in step (a) is written over the user data field of the sector and not over the servo field, preamble sequence, and sync mark; and
the error signature enhanced by the defect filter in step (d) is synchronous to the baud rate and processed to detect medium defects within the user data field.

* * * * *

UNITED STATES PATENT AND TRADEMARK OFFICE
CERTIFICATE OF CORRECTION

PATENT NO. : 5,563,746
DATED : October 8, 1996
INVENTOR(S) : William G. Bliss

It is certified that error appears in the above-indentified patent and that said Letters Patent is hereby corrected as shown below:

Column 8, line 50: Replace "FIGS. 5A, 5B," with --FIGS. 4A and 4B.--;

Column 8, line 51: Delete "5C.";

Column 8, line 55: Replace "FIGS. C4A, C4B, and C4C" with --FIGS. 5A, 5B and 5C--.

Signed and Sealed this

Fourth Day of March, 1997

*Attest:*

BRUCE LEHMAN

*Attesting Officer*     Commissioner of Patents and Trademarks